United States Patent Office 2,859,847
Patented Nov. 11, 1958

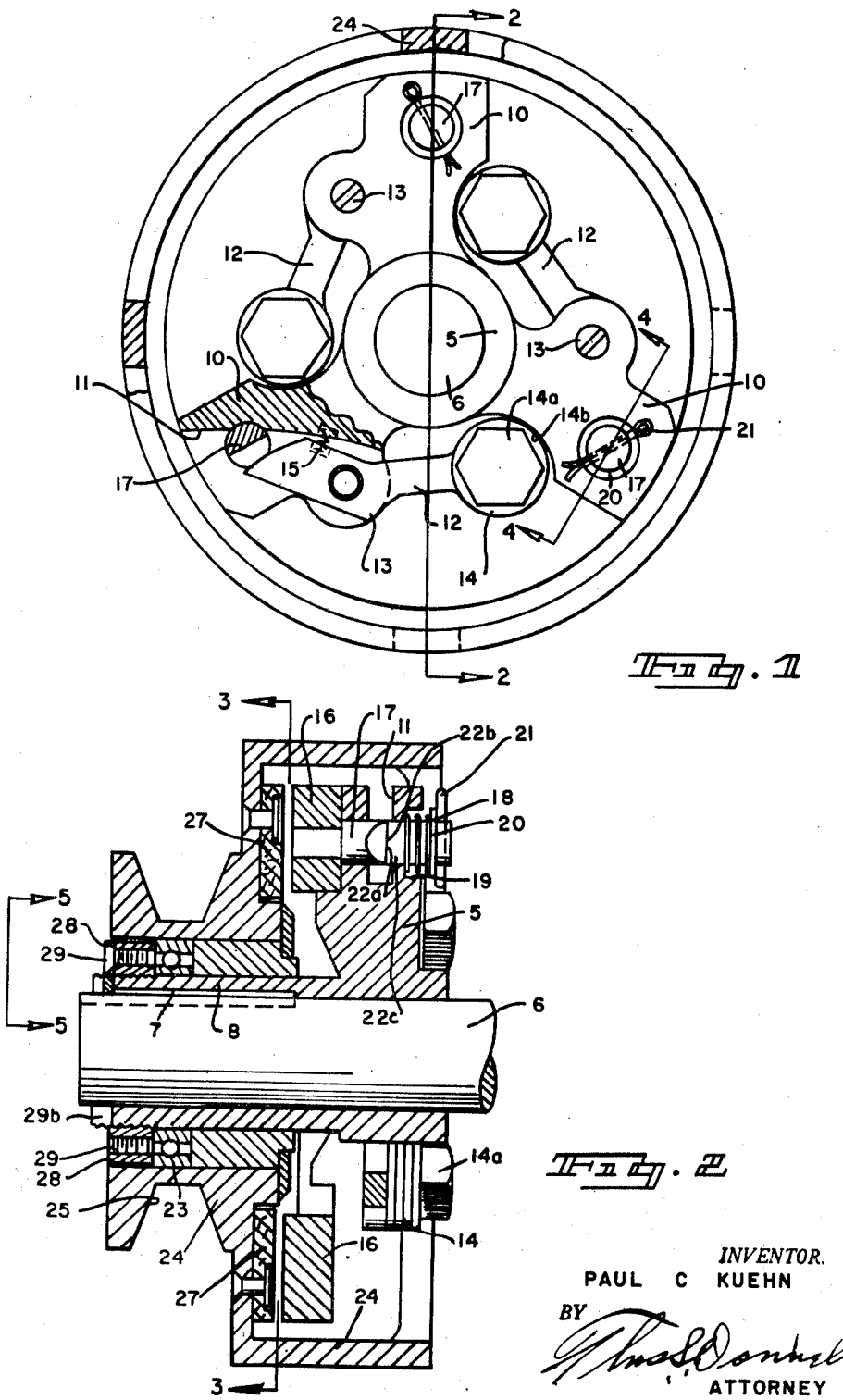

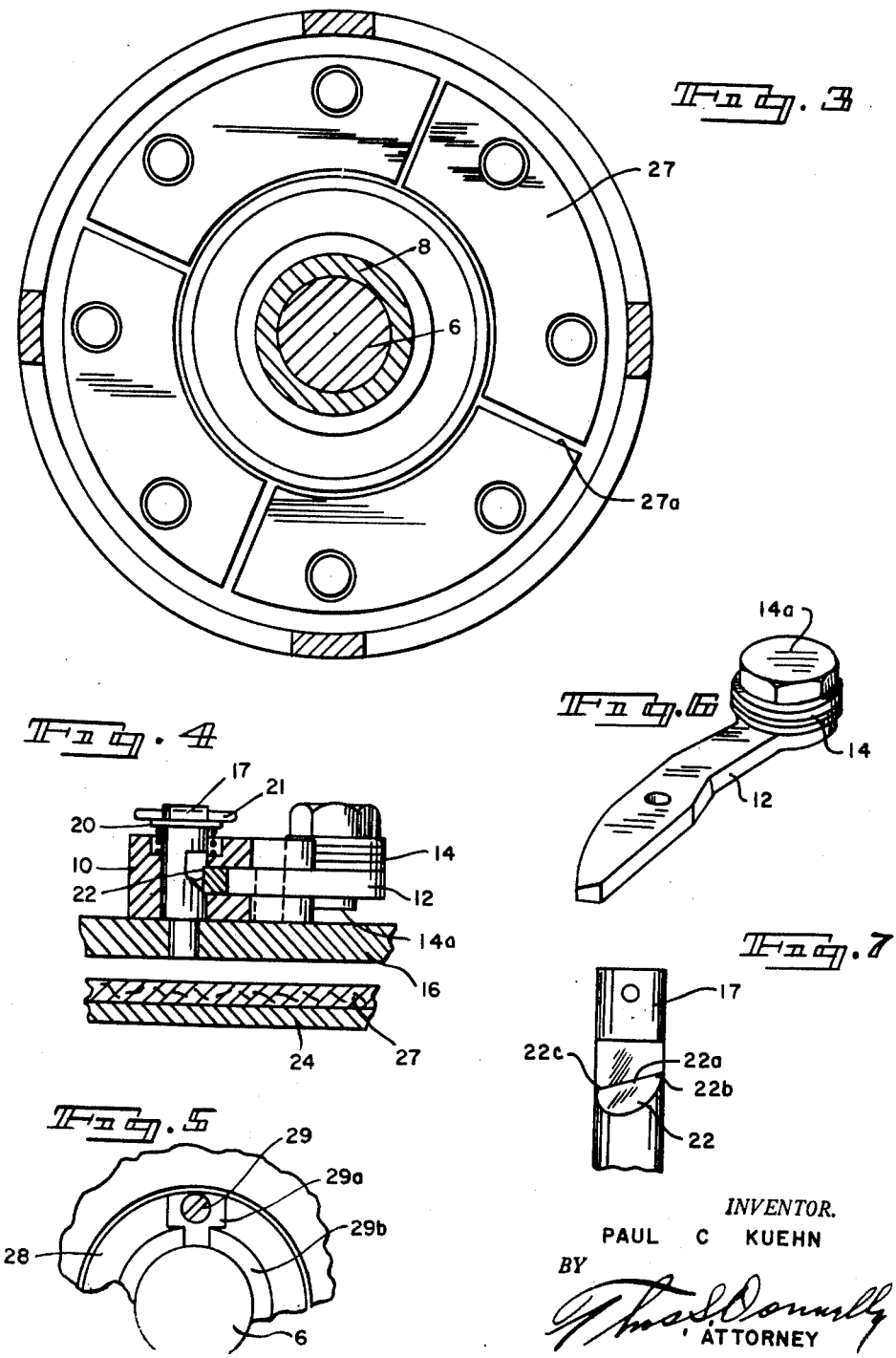

2,859,847

CENTRIFUGALLY ENGAGED FRICTION CLUTCH MECHANISM

Paul C. Kuehn, Kendallville, Ind.

Application February 1, 1954, Serial No. 407,534

4 Claims. (Cl. 192—105)

This application constitutes a continuation in part of my co-pending application, Serial No. 106,547, filed July 25, 1949, now Patent No. 2,696,898.

My invention relates to a new and useful improvement in a centrifugally engaged friction clutch mechanism, adapted for transmitting power from a driving shaft to a driven shaft or similar member.

In the type of friction clutch referred to, a power transmitting member is rotatably mounted, and is usually mounted on the drive shaft in such a manner that a friction plate mounted on the drive shaft may automatically move axially into engagement with the power transmitting member for effecting its rotation in unison with the drive shaft.

The axial movement of the clutch plate is effected through engagement of rockable members which rock into position for moving the clutch plate into position for engaging the power transmitting member. These rockable members rock in response to centrifugal action upon the drive shaft attaining a predetermined speed. These rockable members may be termed fly levers, and in moving into operative position the levers engage an inclined surface of a thrust member, which serves to thrust the clutch plate into engagement with the power transmitting member.

In operating a mechanism of this type, it is necessary that the fly levers quickly release upon the lowering of the speed of the drive shaft so that there may be no binding action between these levers and thrust members engaged thereby.

It is an object of the present invention to provide a mechanism of this class which will be simple in structure, economical of manufacture, durable, compact, and highly efficient in use.

It is another object of the invention to provide a mechanism of this class embodying swingable levers engaging with the inclined faces of a thrust member in such a manner that binding of the levers and the thrust members is avoided.

It is another object of the invention to provide in a mechanism of this type rockable levers engageable with inclined surfaces of thrust members, the inclined surfaces of such thrust members being inclined in two directions to the axis of the thrust members.

Other objects of the invention will appear hereinafter.

It is recognized that various modifications and changes may be made in the structure illustrated without departing from the invention, and it is intended that the present disclosure shall be considered to be but the preferred embodiment.

Forming a part of this application are drawings in which,

Fig. 1 is an end elevational view of the invention with parts broken away and parts shown in section.

Fig. 2 is a sectional view taken on line 2—2 of Fig. 1.

Fig. 3 is a sectional view taken on line 3—3 of Fig. 2.

Fig. 4 is a fragmentary sectional view taken on line 4—4 of Fig. 1.

Fig. 5 is a fragmentary elevational view taken on line 5—5 of Fig. 2.

Fig. 6 is a perspective view of one of the levers used in the invention.

Fig. 7 is a slightly enlarged fragmentary elevational view of a thrust member used in the invention.

As shown in the drawings, the invention embodies a drive head 5, fixedly mounted on the drive shaft 6 which is driven by any suitable source of power. A key 7 serves to secure the hub 8 of the drive head 5 on the drive shaft 6 so that the drive head 5 and the drive shaft 6 rotate in unison with each other. A set screw (not shown) is threaded into the hub 8 so as to bear against th key 7, to prevent axial movement of the hub on the shaft.

The drive head 5 is provided with equally spaced apart radially extending arms 10, the outer ends of which are provided with the slots 11, into which may project one end of the fly levers 12, each of which is pivotally mounted on the arms 10 by means of a pivot pin 13. At the outer end of each of these levers 12 is a weight consisting of a number of washers 14 held in position by the screw 14a which is threaded into the levers 12. By increasing or reducing the number of washers 14, it is obvious that the weight may be varied.

As shown in Fig. 1, when these levers are out of engagement or in inoperative position, the weight 14 engages in a recess 14b formed in the opposed edge of the adjacent arm 10, thus limiting the inward swinging of the weighted end of the lever.

The levers 12 are urged into non-engagement or inoperative position by a spring 15, one of which is located in each of the arms 10.

Upon the inner face of the drive head 5, and concentric therewith, is disposed an annulus constituting the clutch plate 16, secured to which is a plurality of studs 17 which extend loosely through the corresponding arms 10 and through the slots 11 so that a portion of the stud is exposed in the slot. Each stud has disposed about its outer end portion a compression spring 18, one end of which is seated in a socket 19 in the face of the corresponding arm 10, the opposite end of the spring being held in place on the stud by a washer 20 and a pin 21.

Through the action of the springs 18 the clutch plate 16 is normally held out of engagement with the part which cooperates therewith.

A ball bearing 23 embraces the hub 8 of the drive head 5, and mounted on this ball bearing 23 is a driven member or power transmitting member 24. This member 24 is provided with the annular groove 25 to provide a pulley for reception of a belt.

Upon the inner face of the driven member 24 is secured friction plates 27, there being a space 27a between adjacent ends of these friction plate sections 27. There is also provided a thrust bearing 28 extending loosely into the driven member, threaded on the drive head and secured in adjustable position thereon by a key screw 29 which is mounted in a plate 29a lockingly engageable with a ring 29b that is fixed on the drive shaft 6. The inner end of this thrust bearing 28 bears against the bearing 23 so that outward axial movement of the driven member on the hub 8 of the drive head 5 is prevented.

Each stud 17 is notched to provide a cam surface 22. This cam surface 22 is inclined to the longitudinal axis of the stud 17, and this inclination is in two directions. It is clearly indicated in Figs. 4 and 7 that the cam surface is inclined in one direction to the longitudinal axis of the stud 17. This cam surface 22 lies in a plane which is extended on an incline to the longitudinal axis of the stud 17 as shown in Fig. 4. This surface is also tilted laterally to the longitudinal axis of the stud 17, and this appears in Fig. 2 and in Fig. 7.

It will be noted that the line 22a, which is one edge of the cam surface 22, is not normal to the longitudinal axis of the stud 17, the end 22b being higher to the stud 17 than the end 22c. This cam surface is exposed in the slot 11 through which it projects, and is in such position that the end of the swingable lever, upon swinging inwardly of the slot 11 in response to centrifugal action, will engage this cam surface.

However, due to the double incline of the cam surface, the engagement will not be over the entire area of the cam surface but will be at a single point, and as the lever moves further inwardly for engaging the cam surface, the point of engagement will determine the line of the cam surface.

When the drive shaft 6 is rotated at a predetermined speed, the weight 14 will move outwardly to force the other end of each of the levers into engagement with a cam surface, and through this engagement the studs will be forced to move to the left of Fig. 2, thus bringing the clutch plate 16 into engagement with the sections of the friction faces, thereby effecting the rotation of the driven part 24. This frictional engagement between the members 27 and the friction plate 16 will continue as long as the longitudinal thrust is transmitted to the studs sufficiently to hold these parts in engagement.

The longitudinal thrust of the studs is resisted by the springs 18.

When the speed of rotation of the drive shaft 6 is reduced below a predetermined speed, the centrifugal action upon the weights 14 will of course diminish and the backward pressure on the studs exerted by the spring 18 will force the levers to rock into inoperative or non-thrusting position. It is important that this characteristic of the cam surface be maintained. Once the driving part is rotating and the load is increased beyond the torque power of the drive shaft, it is desired that the clutch disengage in order to prevent stalling of the engine.

Due to the single point of contact with the cam surface, a sensitive and quick operating action is obtained. When the clutch is disengaged, the drive shaft will of course pick up speed and again the friction plate will engage the facing sections. If the load is not too great, the driven part will of course commence to rotate. If the load is too great, the drive shaft will again slow down, and again a disengagement of the clutch takes place.

Assuming that the load is too great and the friction plate engages the clutch facing, there is a certain fragment of time which elapses before the clutch can disengage, and during this small period of time the friction plate will be slipping in the clutch facing sections.

Provision of the space 27a eliminates an excessive heating of these sections 27 to end the circumstances just described.

Thus a durable, sensitive and quick-acting mechanism is provided and one which has proven most efficient in use.

What I claim is:

1. A clutch mechanism adapted for use with a rotating shaft, comprising: a drive head fixedly mounted on said shaft; a hub projecting centrally outwardly from one side of said drive head and fixedly mounted on said drive shaft; plurality of spaced arms radiating outwardly from said drive head, each of said spaced arms having a radial slot formed therein between the sides thereof and extending inwardly from the periphery thereof; a stud projecting through each of said arms and spanning the slot therein; a clutch plate, each of said studs being connected at one end to said clutch plate and movable axially of said drive head and rotating in unison therewith for rotating said clutch plate in unison with said drive shaft; a spring on each of said studs normally resisting axial movement of said clutch plate in one direction; a clutch housing rotatably mounted on said hub; a clutch plate in said housing engageable with said first mentioned clutch plate upon movement of said first mentioned clutch plate in one direction a predetermined distance against the tension of said spring and rotating said clutch housing in unison with said shaft; a swing lever mounted on each of said arms and swingable in one direction in response to centrifugal action; a cam surface formed on each of said studs intermediate its ends at the location of said slot for reception of one end of a swing lever upon swinging of the same in response to centrifugal action and moving said first named clutch plate axially of said head into engagement with said second named clutch plate, said cam surface lying in a plane inclined to the longitudinal axis and to a transverse axis of the stud on which formed.

2. In combination, a drive shaft; a drive head fixedly mounted on said shaft; a clutch plate extending around said shaft; a plurality of studs, each secured at one end to said clutch plate and slideably projected through said drive head and mounting said clutch plate on said drive head for rotation in unison therewith, said clutch plate being axially moveable of said drive head; spring means for normally resisting movement of said clutch plate axially of said drive head in one direction; a power transmitting means comprising a clutch facing rotatably mounted on said shaft, said clutch facing being opposed to said clutch plate and engageable therewith upon movement of said clutch plate toward such said clutch facing a predetermined distance; swingable arms carried by said drive head and swingable at one end outwardly in response to centrifugal action and at the other end inwardly toward said studs, there being formed on each of said studs a cam surface engageable with the inner end of said arms, said cam surface being inclined in two directions to the longitudinal axis of the stud on which formed and the engagement of the inner ends of said arms with the cam surface effecting a movement of said clutch plate, against the force of said springs into engagement with said clutch facing.

3. In combination, a drive shaft; a drive head fixedly mounted on said shaft; a clutch plate extending around said shaft; a plurality of studs, each secured at one end to said clutch plate and slideably projected through said drive head and mounting said clutch plate on said drive head for rotation in unison therewith, said clutch plate being axially moveable of said drive head; spring means for normally resisting movement of said clutch plate axially of said drive head in one direction; a power transmitting means comprising a clutch facing rotatably mounted on said shaft, said clutch facing being opposed to said clutch plate and engageable therewith upon movement of said clutch plate toward such said clutch facing a predetermined distance; swingable arms carried by said drive head and swingable at one end outwardly in response to centrifugal action and at the other end inwardly toward said studs, there being formed on each of said studs a cam surface engageable with the inner end of said arms, said cam surface being inclined in two directions to the longitudinal axis of the stud on which formed and the engagement of the inner ends of said arms with the cam surface effecting a movement of said clutch plate, against the force of said springs into engagement with said clutch facing; said clutch facing determining an annulus and comprising a plurality of sections spaced apart at adjacent ends.

4. A clutch of the class described adapted for use with a drive shaft, comprising: a drive head fixedly mounted on and rotatable in unison with said drive shaft; a clutch plate surrounding said shaft; a plurality of studs each secured at one of their ends to said clutch plate and projecting outwardly from one face thereof and slidable axially of said drive head and effecting a rotation of said clutch plate in unison with said drive head; spring means normally resisting movement of said clutch plate axially away from said drive head; a power transmitting member rotatably mounted on said shaft; a clutch facing fixedly mounted on one face of said power transmitting member and positioned in an opposed relation to said clutch plate and engageable therewith upon axial movement of said clutch plate in one direction, a predetermined distance, there being formed on each of said studs a cam surface inclined to the longitudinal axis and to a transverse axis of the stud on which formed; swingable arms pivotally mounted intermediate their ends on said drive head and, upon rotation of said drive head, swingable outwardly at one of their ends and inwardly at their opposite ends into engagement with said cam surfaces and effecting a movement of said clutch plate into engagement with said clutch facing.

References Cited in the file of this patent

UNITED STATES PATENTS

| | | |
|---|---|---|
| 1,503,818 | Crane | Aug. 5, 1924 |
| 1,670,877 | Bruckmann | Aug. 19, 1925 |
| 1,718,105 | Benn | June 18, 1929 |
| 1,990,614 | Robertson et al. | Feb. 12, 1935 |
| 2,107,075 | Lyman | Feb. 1, 1938 |
| 2,201,339 | Hunt | May 21, 1940 |
| 2,249,281 | Wellman | July 15, 1941 |
| 2,491,003 | Elmore | Dec. 13, 1949 |
| 2,696,898 | Kuehn | Dec. 14, 1954 |